(12) United States Patent
Ritter

(10) Patent No.: US 6,839,569 B1
(45) Date of Patent: Jan. 4, 2005

(54) MOBILE RADIO EQUIPMENT WITH YOKE ANTENNA

(75) Inventor: Kai-Uwe Ritter, Roth (DE)

(73) Assignee: Lucent Technologies Inc., Murray Hill, NJ (US)

( * ) Notice: Subject to any disclaimer, the term of this patent is extended or adjusted under 35 U.S.C. 154(b) by 402 days.

(21) Appl. No.: 10/168,358

(22) PCT Filed: Jun. 2, 2000

(86) PCT No.: PCT/EP00/05101

§ 371 (c)(1),
(2), (4) Date: Mar. 6, 2002

(87) PCT Pub. No.: WO01/22526

PCT Pub. Date: Mar. 29, 2001

(30) Foreign Application Priority Data

Sep. 21, 1999 (EP) .............................................. 99307473

(51) Int. Cl.[7] ................................................. H04B 1/38
(52) U.S. Cl. .................................... 455/550.1; 343/702
(58) Field of Search .............................. 455/90.3, 575.1, 455/550.1, 575.7; 343/702, 741, 866, 871, 726, 700 MS, 901

(56) References Cited

U.S. PATENT DOCUMENTS

| 4,914,714 A | 4/1990 | Tamura | |
|---|---|---|---|
| 6,188,362 B1 | * 2/2001 | Igarashi | 343/702 |
| 6,625,469 B1 | * 9/2003 | Hwang et al. | 455/550.1 |

FOREIGN PATENT DOCUMENTS

EP          0389 676 A     10/1990     ............ H04M/1/72

* cited by examiner

Primary Examiner—Vivian Chin
Assistant Examiner—Sanh Phu
(74) Attorney, Agent, or Firm—Jimmy Goo

(57) ABSTRACT

Mobile radio equipment (cell phone) with two individual antennas (21, 22), which are shaped by means of a non-conducting intermediate piece (23) into a yoke, which can be used to suspend the cell phone, for example on a charging equipment (3) or a speakerphone. Built-in filters provide for the multiple uses of the antenna as leads.

10 Claims, 1 Drawing Sheet

MOBILE RADIO EQUIPMENT WITH YOKE ANTENNA

This application is the national phase under 35 U.S.C 371 of PCT International Application NO. PCT/EP00/05101, which has an international filing date of Jun. 2, 2000, which designated the United States of America.

The invention relates to a mobile radio equipment according to the preamble of claim 1.

In mobile radio equipments (cell phones) there is a tendency toward reducing the size of the equipment. Furthermore, for the most part only one antenna is used, and is designed for both transmitting and receiving, and is thus of broad-band design, leading to a worsening of the transmitting and receiving levels. A further problem relates to the plug connector to a charging station or to a speakerphone device.

The invention has as its object to construct a mobile radio equipment with a built-in antenna such that additional functions can be carried out with the antenna. This object is attained by means of the features of claim 1 and further developed by the features of the dependent claims.

In that the built-in antenna is constructed as a yoke or loop, the antenna can simultaneously have carrying functions for the cell phone; i.e., the cell phone can be carried in the hand, with the antenna as a loop, or the cell phone can be fastened with the loop to a belt, and finally the cell phone can be hung up, stationary, by the yoke. The construction of the antenna as a loop or yoke furthermore makes possible a good integration into the design aspects of the cell phone. This favors the acceptance of relatively long antennas in relation to the size of the mobile radio device. The radiative properties of the antenna are thereby improved at the frequencies which are used at the present time. The construction of the antenna from two metal portions furthermore makes possible the separation of transmission from reception, so that each individual antenna can be matched to the purpose of its use. Finally, the two metal portions of the antenna also serve as a contacts for a charging station or a speakerphone, which is particularly of use in connection with car phones.

Further details of the invention will become apparent from the following embodiment examples.

Figure 1:
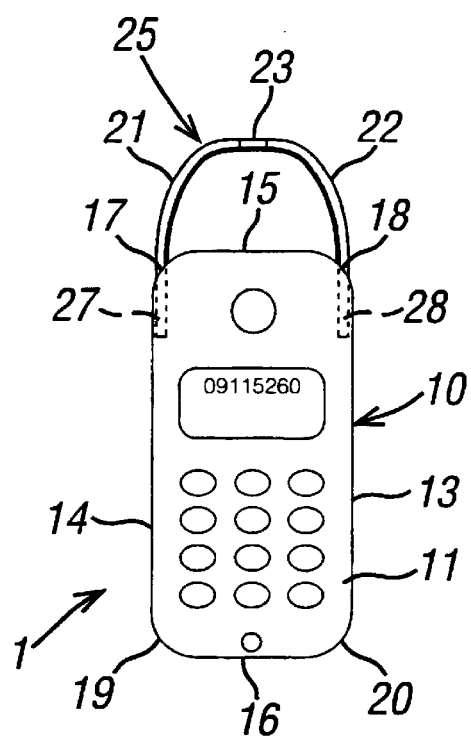
Figure 2:
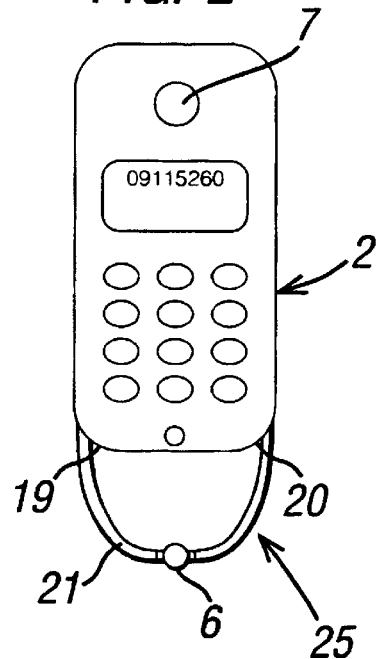
Figure 3:
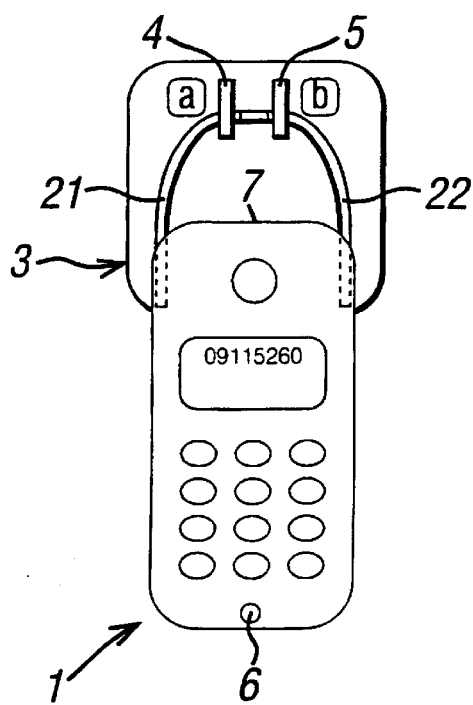
Figure 4:
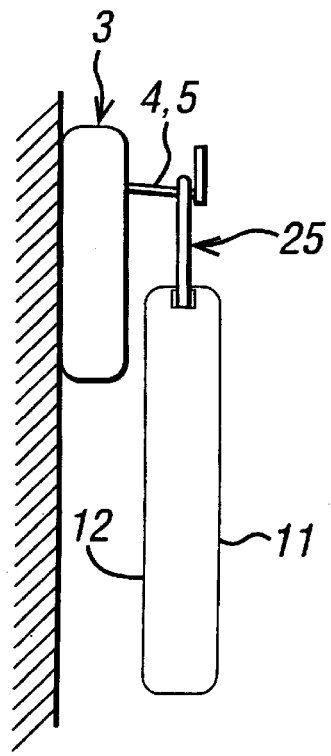

FIG. 1 shows a plan view of a cell phone with a yoke as antenna on the upper side, FIG. 2 shows a cell phone with a yoke on the lower side, FIG. 3 shows the cell phone of FIG. 1 suspended in a charging device, and FIG. 4 shows a side view of the charging station with a suspended cell phone.

FIG. 1 shows a first embodiment of the cell phone 1 according to the invention. This is built into a flat, narrow, parallelepipedal housing 10, which accordingly has a front side 11, a back side 12, long narrow sides 13, 14 and short narrow sides 15, 16. The edges and corners between these sides 11–16 are rounded, as indicated at 17–20. The housing 10 can also itself have a curvature along its longitudinal axis. A yoke 25 consisting of two metal wires 21, 22 and a non-conductive connecting portion 23 starts or ends at the corners or edges 17, 18, and is thus arranged in a loop. The ends 27, 28 of the metal wires 21 and 22 which are seated in the housing and are not connected together are connected via suitable filters to equipment portions (not shown in the drawing) of the mobile radio equipment.

The metal wires 21 and 22 respectively serve as separate transmitting or receiving antennas. Since the transmitting and receiving frequencies are not the same, the lengths of the wire pieces 21 and 22 can be chosen to be correspondingly different, in order to tune the individual antennas 21 and 22 optimally to their operating frequencies. The connection 23 therefore does not need to take place in the middle. The unequal length of the two individual antennas 21 and 22 can also be used for antenna diversity. The receiving antenna is connected as the preferential antenna, and when fading occurs there can be a switch-over to the transmitting antenna. When the receiving conditions change slowly, perhaps during use by a pedestrian, this kind of switching is very effective.

The two metal pieces 21 and 22 can also be used as leads for charging the mobile radio equipment 1, as shown in FIGS. 3 and 4. A charging equipment 3 has two hooks 4 and 5 as charging poles, on which the yoke is placed so that the hook 4 contacts the metal wire 21 and the hook 5 contacts the metal wire 22. Direct current filters are connected to the unconnected ends 27, 28 of the metal wires 21 and 22, and are connected to the battery of the mobile radio telephone. The charging current is conducted from the charging equipment 3 to the battery of the mobile radio equipment in this manner.

The metal wires 21 and 22 can also be used for connecting to a speakerphone, which is of particular concern in a motor vehicle. The microphone 6 built into the mobile radio equipment itself is furthermore used for this purpose. When the mobile radio equipment 1 is suspended in the manner shown in FIG. 3, the low frequency signal is switched to the wires 21 and 22 instead of to the loudspeaker 7, in order to reach the speakerphone via the hooks 4, 5. Besides this, it is possible to combine the charging station and the speakerphone device, since the respective frequencies can easily be separated by filters.

Finally, it is also possible to use the metal wires 21 and 22 as supply leads for a high frequency transmitter-receiver amplifier, which supplies an external antenna, for example a motor vehicle antenna. For this case of operation it is possible to reduce the transmission power of the mobile radio equipment in order not to radiate excessive power via the free antennas 21, 22 into the interior of the vehicle.

FIG. 2 shows a further embodiment 2 of the cell phone. The metal wires 21, 22 go out from the lower edges 19 and 20 of the housing 10 and meet in the connecting piece 23 into which the microphone is inserted. In addition, the cell phone can be held so that the radiation from the antenna does not take place near the head, favoring the radiation into space and reducing the risk to health.

In addition to the advantages already-mentioned, the following further advantages can be set out:

The separation of the transmitter output from the receiver input permits a more favorable layout of the switching parts in the mobile radio equipment.

The use of the antennas as charging and speakerphone contacts can enable the plug connectors which are otherwise usual on a cell phone to be dispensed with. In this case, an infrared interface on the cell phone will be used for the data transfer function.

The yoke formed by the portions 21, 22, 23 can also be used for carrying the equipment, for example, suspended on the user's belt. The cell phone can also be hung up by the yoke in a dwelling.

The metal wires can be made relatively stiff, and it is possible to pull out the frame thus formed from the contours of the housing 10 to place it in the operating position, or to push it back in order to make the equipment more compact. A flexible embodiment of the yoke 21, 22, 23 is also possible, and then only one end of the yoke needs to be pushed to let it disappear into the contours of the housing 10.

What is claimed is:

1. Mobile radio equipment comprising a housing in the form of a flat, narrow parallelepiped with wide front and back sides and with long narrow sides and short narrow sides, wherein the corners and edges can be rounded and the longitudinal axis can be curved, and a built-in antenna means in the housing, wherein said built-in antenna comprises two individual antennas connected together by a non-conducting intermediate piece and formed into a yoke or loop, said yoke or loop having unconnected ends connected to associated equipment portions of the mobile radio equipment by means of filters.

2. Mobile radio equipment according to claim 1, wherein the individual antennas consist of metal wires and the first metal wire is connected as the receiving antenna and the second metal wire is connected as the transmitting antenna.

3. Mobile radio equipment according to claim 1, wherein the yoke or loop spans the short upper narrow side of the equipment.

4. Mobile radio equipment according to claim 1, wherein the yoke or loop spans the short lower narrow side of the equipment, and a microphone is built into the non-conducting connecting portion.

5. Mobile radio equipment according to claim 1, wherein the yoke forms a solid frame which follows the contour of the housing and can be pushed into this when not in use.

6. Mobile radio equipment according to claim 1, wherein the loop is flexible and can be pushed into the contour of the housing when not in use.

7. Mobile radio equipment according to claim 2, wherein the individual antennas can be alternatively switched over for receiving or transmitting.

8. Mobile radio equipment according to claim 1, also comprising a charging station associated with the mobile radio equipment and constructed with charging poles in the form of two hooks which are arranged so that the mobile radio equipment is supported with the first individual antenna on the first hook and with the second antenna on the second hook, when the mobile radio equipment is suspended on the hooks, and wherein the unconnected ends are connected via direct current filters to the battery of the mobile radio equipment.

9. Mobile radio equipment according to claim 3, also comprising a speakerphone associated with the mobile radio equipment and constructed with signal leads in the form of two hooks which are arranged so that the mobile radio equipment is supported with the first individual antenna on the first hook and with the second antenna on the second hook, when suspended on the hooks, and that the ends which are not connected are connected via low frequency filters to the speakerphone.

10. Mobile radio equipment according to claim 3, also comprises a transmitter/receiver amplifier which is associated with the mobile radio equipment and has allocated to it an external antenna and also input and output leads in the form of two hooks which are arranged so that the mobile radio equipment is supported with the first individual antenna on the first hook and with the second antenna on the second hook, when suspended on the hooks, and wherein the unconnected ends are connected via high frequency filters to the transmitter/receiver portions of the mobile radio equipment.

* * * * *